United States Patent

Inoue

[11] Patent Number: 5,816,231
[45] Date of Patent: Oct. 6, 1998

[54] CONTROLLER FOR HEATER OF AIR-FUEL-RATIO SENSOR

[75] Inventor: Toshio Inoue, Susono, Japan

[73] Assignee: Toyota Jidosha Kabushiki Kaisha, Aichi, Japan

[21] Appl. No.: 879,347

[22] Filed: Jun. 20, 1997

[30] Foreign Application Priority Data

Jun. 24, 1996 [JP] Japan ................................ 8-163103

[51] Int. Cl.$^6$ .......................... G01N 27/416; F02D 41/14
[52] U.S. Cl. .......................... 123/689; 060/277; 123/697; 219/497
[58] Field of Search .................... 123/389, 697; 60/276, 277; 73/23.32; 204/425, 426; 219/490, 497

[56] References Cited

U.S. PATENT DOCUMENTS 4,561,402  12/1985  Nakano et al. ............... 123/697 X
5,656,190   8/1997  Aoki ............................ 219/497 X

FOREIGN PATENT DOCUMENTS 60-214251  10/1985  Japan .
1-158335    6/1989  Japan .
1-265148   10/1989  Japan .

Primary Examiner—Tony M. Argenbright
Attorney, Agent, or Firm—Kenyon & Kenyon

[57] ABSTRACT

An apparatus controls power supplied to a heater of an air-fuel-ratio sensor in consideration of the radiant heat from a catalytic converter. A map showing a relationship between power supplied to the heater and engine operating conditions is prepared on the assumption that radiant heat from the converter never affects the temperature of the sensor. Another map showing the same relationship is prepared on the assumption that radiant heat from the converter, which is new, affects the temperature of the sensor. A difference $\Delta Qij = Q2ij - Q1ij$ is calculated under the same engine operating conditions, where $Q1ij$ is power supplied to the heater with radiant heat from the converter affecting the temperature of the sensor and $Q2ij$ is power supplied to the heater with radiant heat from the converter not affecting the temperature of the sensor. At the same time, a deterioration index DR of the converter is calculated. The deterioration index DR is used to determine a coefficient $\alpha$. The target power $Qij$ supplied to the heater is calculated as $Qij = Q2ij - \alpha \times (Q2ij - Q1ij)$. Namely, the difference $\Delta Qij$ is multiplied by the coefficient $\alpha$, and the product is subtracted from $Q2ij$, to provide the target power $Qij$.

3 Claims, 8 Drawing Sheets

CONTROLLER FOR HEATER OF AIR-FUEL-RATIO SENSOR

BACKGROUND OF THE INVENTION

1. Field of the Invention

The present invention relates to a controller for controlling a heater of an air-fuel-ratio sensor installed close to a catalytic converter in an exhaust duct of an internal combustion engine.

2. Description of the Related Art

An internal combustion engine has an exhaust duct in which a catalytic converter and an air-fuel-ratio sensor are disposed. To quickly activate the air-fuel-ratio sensor and maintain the active state thereof, the sensor is usually provided with a heater. The temperature of the sensor is influenced by exhaust gas. To compensate for the influence of exhaust gas on the sensor, Japanese Unexamined Patent Publication No. 1-158335 discloses a suitable technique. This technique calculates basic power according to engine operating conditions and controls the supply of power to the heater of the sensor based on the basic power.

The catalytic converter heats up to a high temperature of several hundred degrees centigrade. If the air-fuel-ratio sensor is close to the catalytic converter, radiant heat from the catalytic converter will heat the sensor. The above disclosure does not consider the radiant heat from the catalytic converter when calculating the basic power supplied to the heater of the sensor. This results in excessively heating the sensor and a shortening of the service life thereof.

SUMMARY OF THE INVENTION

An object of the present invention is to provide a controller for a heater of an air-fuel-ratio sensor of an internal combustion engine, capable of controlling the supply of power to the heater in consideration of the radiant heat from a catalytic converter.

In order to accomplish the object, the present invention provides a controller for controlling the supply of power to a heater of an air-fuel-ratio sensor. The sensor is installed close to a catalytic converter in an exhaust duct of an internal combustion engine, to detect the air-fuel ratio of exhaust gas emitted from the engine. The controller consists of a detector for detecting engine operating conditions, a basic power calculator for calculating basic power according to the engine operating conditions, a corrective power calculator for calculating corrective power corresponding to radiant heat from the catalytic converter, a target power calculator for calculating target power from the basic power and corrective power, and a power supply controller for controlling the supply of power so that the heater receives the target power.

BRIEF DESCRIPTION OF THE DRAWINGS

The present invention will be more clearly understood from the description of the preferred embodiments as set forth below with reference to the accompanying drawings, wherein.

DESCRIPTION OF THE PREFERRED EMBODIMENTS

Figure 1:
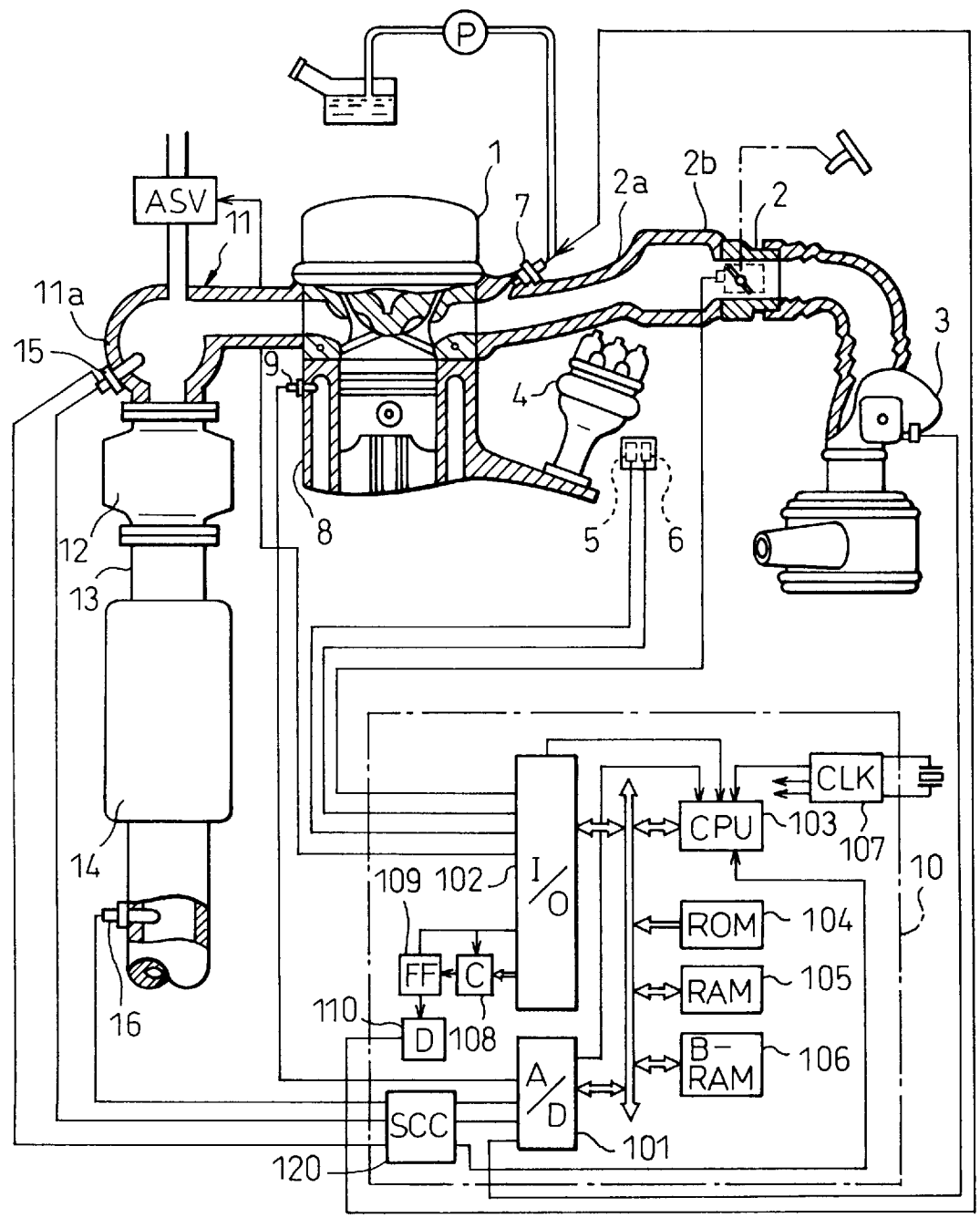
FIG. 1 generally shows an embodiment of the present invention.

FIG. 1 generally shows an embodiment of the present invention applied to an internal combustion engine of a vehicle. An intake manifold 2a is connected to an intake port of each cylinder of the engine 1. An exhaust manifold 11 is connected to an exhaust port of each cylinder of the engine 1.

The intake manifold 2a is connected to a surge tank 2b, which is connected to an intake duct 2. An airflow meter 3 detects the quantity of intake air. The airflow meter 3 may be a variable vane airflow meter incorporating a potentiometer to generate a voltage signal that is proportional to the quantity of intake air.

A fuel injection valve 7 is arranged in the intake manifold 2a in the vicinity of the intake port of each cylinder. The fuel injection valve 7 opens in response to a signal from an engine control unit (ECU) 10, to inject pressurized fuel into the intake port.

A downstream part of the exhaust manifold 11 is connected to a front catalytic converter 12. A downstream part of the converter 12 is connected to an exhaust pipe 13. In the middle of the exhaust pipe 13, there is a rear catalytic converter 14.

The front and rear catalytic converters 12 and 14 each incorporate a three-way catalyst to simultaneously purify HC, CO, and NOx contained in exhaust gas. The converter 12 is close the to exhaust ports of the engine, and therefore, is easily heated and activated. Accordingly, the converter 12 serves mainly for a warm-up operation after the engine is started. The volume of the converter 12 is small so that it is quickly heated. During usual driving, the converter 12 cooperates with the converter 14 having a larger volume.

An upstream air-fuel-ratio sensor 15 is arranged at a collective part 11a of the exhaust manifold 11 on the upstream side of the front catalytic converter 12. A downstream air-fuel-ratio sensor 16 is arranged in the exhaust pipe 13 on the downstream side of the rear catalytic converter 14. The sensor 15 has a heater 15b.

An ignition distributor 4 has two crank angle sensors 5 and 6 for generating pulse signals at predetermined crankshaft rotations. Namely, the sensor 5 provides a reference position pulse signal whenever a specific cylinder reaches, for example, a top compression dead center, i.e., at intervals of 720 degrees crank angle. The sensor 6 provides a rotation angle pulse signal at intervals of, for example, 30 degrees crank angle.

A water jacket 8 of a cylinder block of the engine 1 has a cooling water temperature sensor 9 for providing an analog voltage representing the temperature of the engine cooling water.

The engine control unit (ECU) 10 is a digital computer having an AD converter 101, an I/O interface 102, a CPU 103, a ROM 104, a RAM 105, a backup RAM 106, and a bidirectional bus that connects these parts to one another. The backup RAM 106 is connected directly to a power source, to hold data even if an engine ignition switch is turned off. The ECU 10 also has a clock generator 107, a down counter 108, a flip-flop 109, and a driver 110. The ECU 10 controls basic operations such as a fuel injection operation and an air-fuel-ratio control operation.

The ECU 10 receives, through the AD converter 101, the signal representing the quantity of intake air from the airflow meter 3, the signal representing the temperature of engine cooling water from the temperature sensor 9, a signal from the air-fuel-ratio sensor 15, and a signal from the air-fuel-ratio sensor 16. The ECU 10 also receives, through the I/O interface 102, the pulse signals from the crank angle sensors 5 and 6.

The signals representing the quantity of intake air and the temperature of engine cooling water are fetched according to an AD conversion routine carried out at predetermined crank intervals and are stored as intake air data Q and water temperature data THW in the RAM 105. A pulse interval of the pulse signal from the crank angle sensor 6 is used by a routine (not shown) to calculate an engine revolution speed, which is stored as engine speed data NE in the RAM 105.

The ECU 10 also has a sensor controller (SCC) 120 that includes a circuit for controlling power supplied to the heater 15b of the air-fuel-ratio sensor 15 that is affected by radiant heat from the catalytic converter 12.

Figure 2:
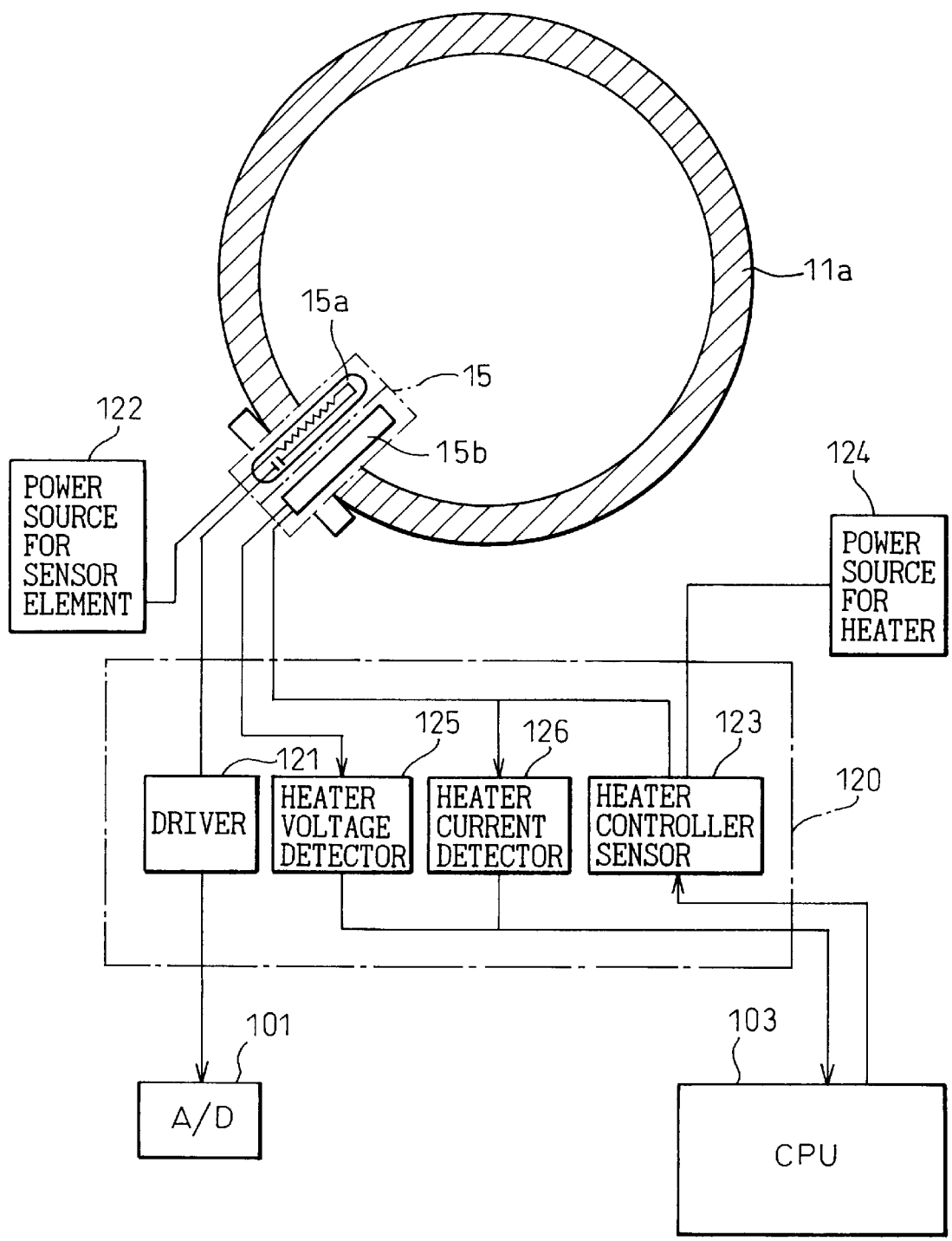
FIG. 2 schematically shows an air-fuel-ratio sensor according to the embodiment.

FIG. 2 schematically shows the inside of the air-fuel-ratio sensor 15 and the sensor controller 120. The sensor 15 consists of a sensor element 15a and the heater 15b. The sensor controller 120 has a driver 121. The driver 121 has a resistor for detecting a current passing through the sensor element 15a when a power source 122 applies a given voltage to the sensor element 15a, and an amplifier for amplifying a voltage drop due to the resistor. The output of the driver 121 is passed through the AD converter 101 to the CPU 103.

A heater controller 123 controls power supplied from a power source 124 to the heater 15b in response to a control signal from the CPU 103.

A heater voltage detector 125 detects a voltage applied to the heater 15b. A heater current detector 126 detects a current passing through the heater 15b when the heater 15b is energized.

The principle of the present invention will be explained.

The present invention corrects the influence of radiant heat from the catalytic converter 12 on the air-fuel-ratio sensor 15 by controlling the supply of power to the heater 15b, thereby optimizing the temperature of the sensor 15.

Heat related to the sensor 15 will be explained.

Incoming heat to the sensor 15 is heat from the heater 15b, radiant heat from the catalytic converter 12, and the heat of exhaust gas when the temperature of the exhaust gas is higher than that of the sensor 15.

Outgoing heat from the sensor 15 is heat escaping by conduction and heat taken by exhaust gas when the temperature of the exhaust gas is lower than that of the sensor 15.

Figure 3:
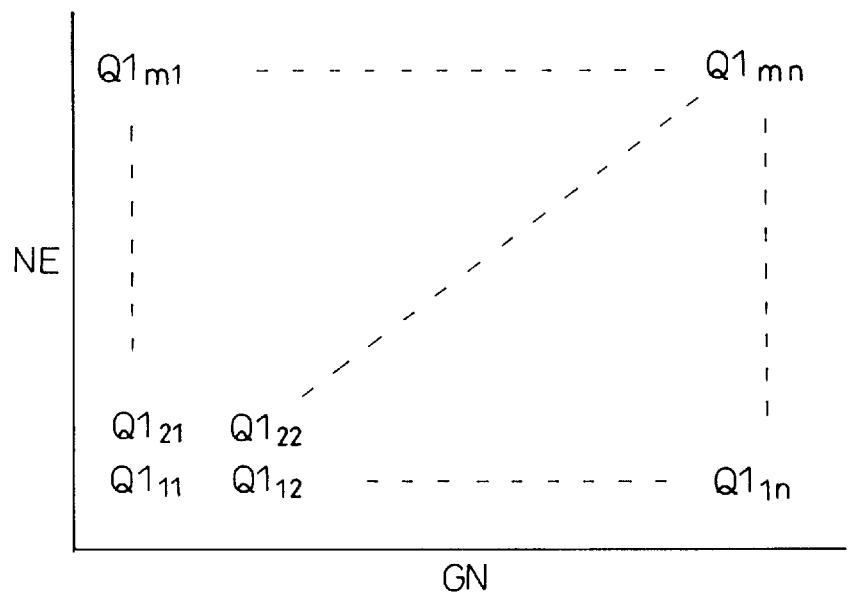
FIG. 3 is a map showing a relationship between power supplied to a heater of the air-fuel-ratio sensor and engine operating conditions with the temperature of the sensor being affected by a new catalytic converter.

If the radiant heat from the catalytic converter 12 is unchanged through the service life thereof, the radiant heat is dependent only on the operating conditions of the engine. FIG. 3 shows a map used to find out power Q1ij supplied to the heater 15b according to engine operating conditions when radiant heat from the converter 12, which is new and not deteriorated, to the sensor 15, is unchanged.

In practice, radiant heat from the catalytic converter 12 drops as the converter 12 deteriorates.

Figure 4:
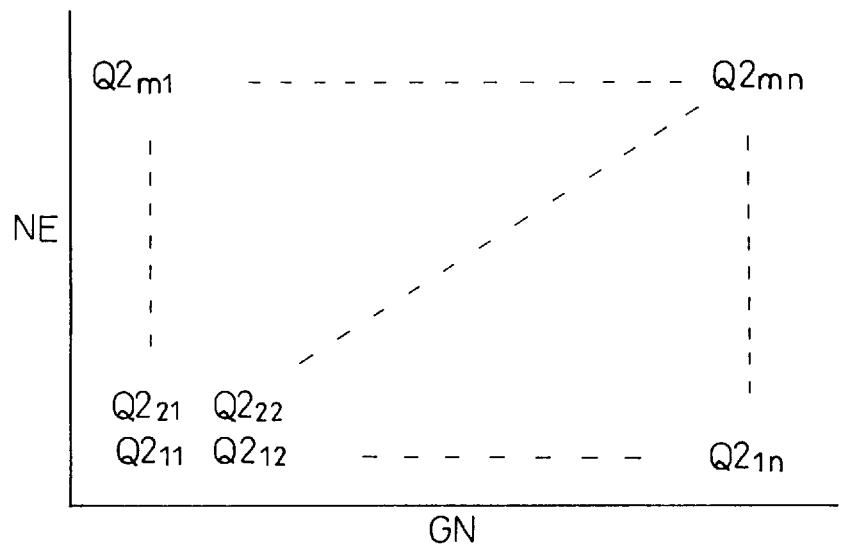
FIG. 4 is a map showing a relationship between power supplied to the heater and engine operating conditions with the temperature of the sensor receiving no influence of a catalytic converter.

FIG. 4 is a map used to find out power Q2ij supplied to the heater 15b according to engine operating conditions when radiant heat from the converter 12 has no influence on the sensor 15.

Figure 5:
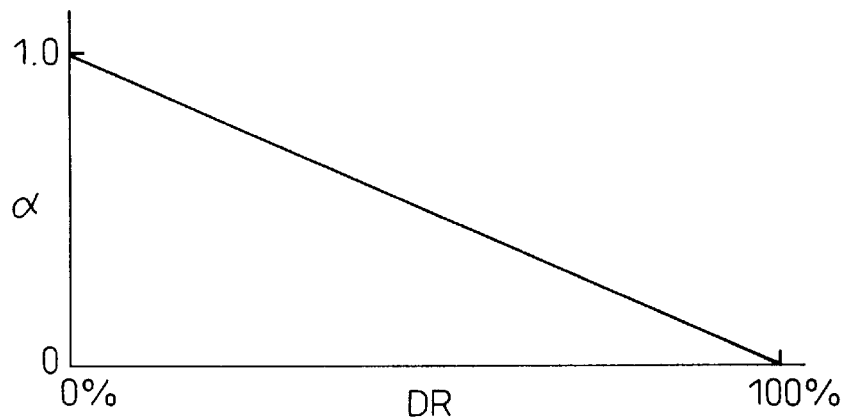
FIG. 5 is a graph showing a relationship between a deterioration index of a catalytic converter and a coefficient used to correct power supplied to the heater of the sensor.

The difference "$\Delta Qij = Q2ij - Q1ij$" indicates power corresponding to the radiant heat applied to the sensor 15 from a converter 12 that is new. As the converter 12 deteriorates, the radiant heat decreases accordingly. FIG. 5 shows a relationship between a coefficient $\alpha$ and a deterioration index DR of the converter 12. The difference $\Delta Qij$ is multiplied by the coefficient $\alpha$, to correct power applied to the heater 15b.

Target power supplied to the heater 15b is expressed as follows:

$$Qij = Q2ij - \alpha \times \Delta Qij = Q2ij - \alpha \times (Q2ij - Q1ij) \tag{1}$$

where $\alpha$ is 1 when the converter 12 is new and decreases as the converter 12 deteriorates.

Figure 6:
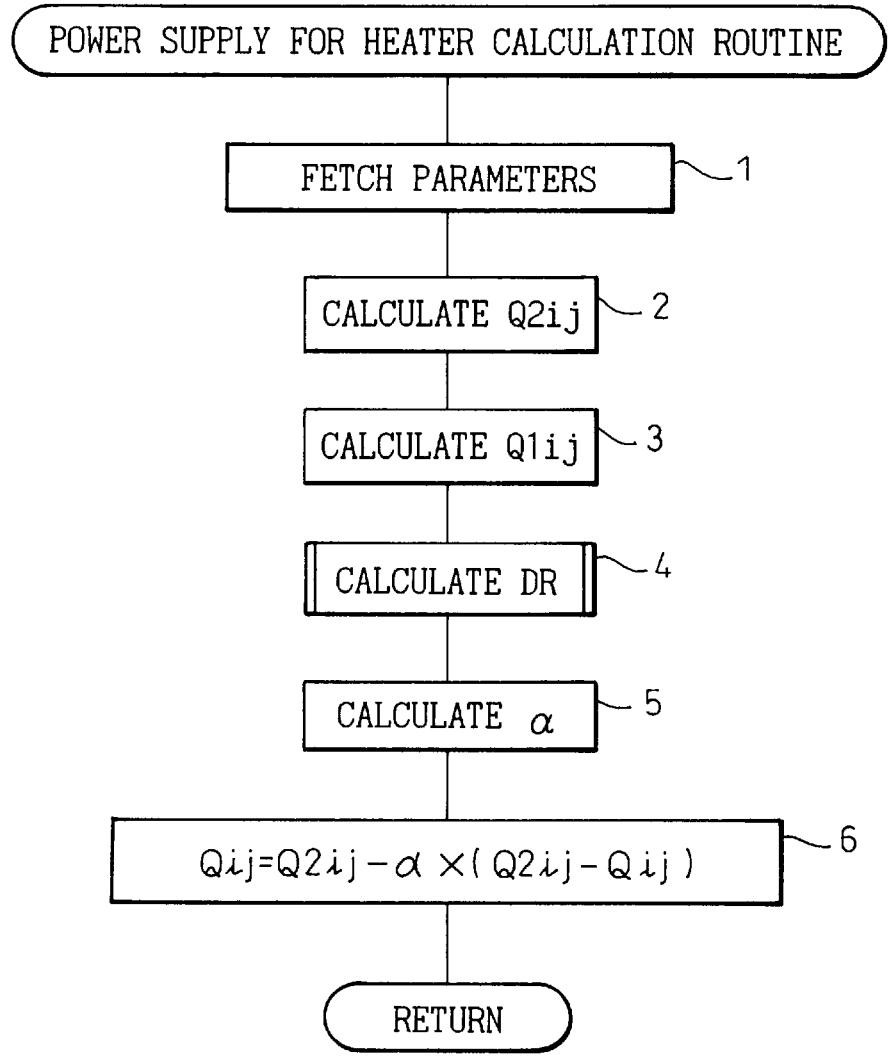
FIG. 6 is a flowchart showing a routine for calculating target power supplied to the heater.

FIG. 6 is a flowchart showing a routine for calculating the target power Qij supplied to the heater 15b.

Step 1 reads parameters. Step 2 refers to the map of FIG. 4 and calculates basic power Q2ij on the assumption that the air-fuel-ratio sensor 15 is not affected by radiant heat from the catalytic converter 12. Step 3 refers to the map of FIG. 3 and calculates power Q1ij on the assumption that the sensor 15 receives radiant heat from a converter 12 that is new. Step 4 calculates a deterioration index DR of the converter 12. Step 5 calculates a coefficient $\alpha$ according to the deterioration index DR. Step 6 calculates the target power Qij according to the expression (1).

Calculating the deterioration index DR of the converter 12 in step 4 will be explained.

Figure 7A:
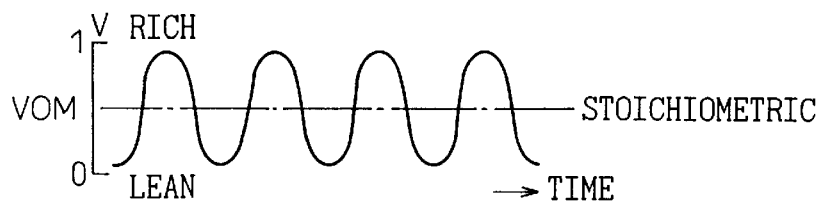
FIGS. 7A to 7C show output signals of air-fuel-ratio sensors in different conditions.
Figure 7B:
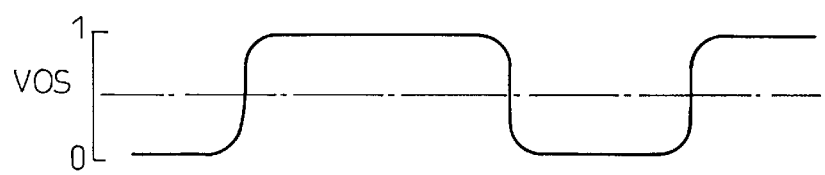

FIGS. 7A to 7B show output signals of the front and rear air-fuel-ratio sensors 15 and 16 under different conditions.

A waveform in FIG. 7A shows an output VOM of the sensor 15 during an air-fuel-ratio feedback control operation. A waveform in FIG. 7B shows an output VOS of the sensor 16 when the converter 12 is new. A waveform in FIG. 7C shows an output VOS of the sensor 16 when the converter 12 involves some deterioration.

Figure 7C:
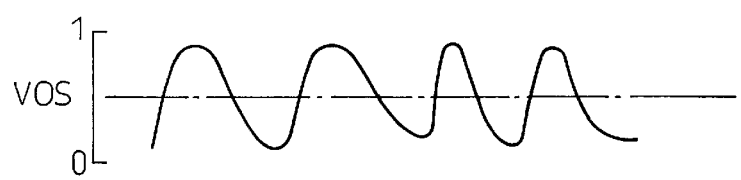

A locus length LVOS of the output VOS of the sensor 16 of the waveform in FIG. 7C in a given interval with the converter 12 involving deterioration is longer than that of the waveform in FIG. 7B with no deterioration. The locus lengths of the outputs of the sensor 16 are useful to determine the deterioration index DR of the catalytic converter 12.

Figure 8:
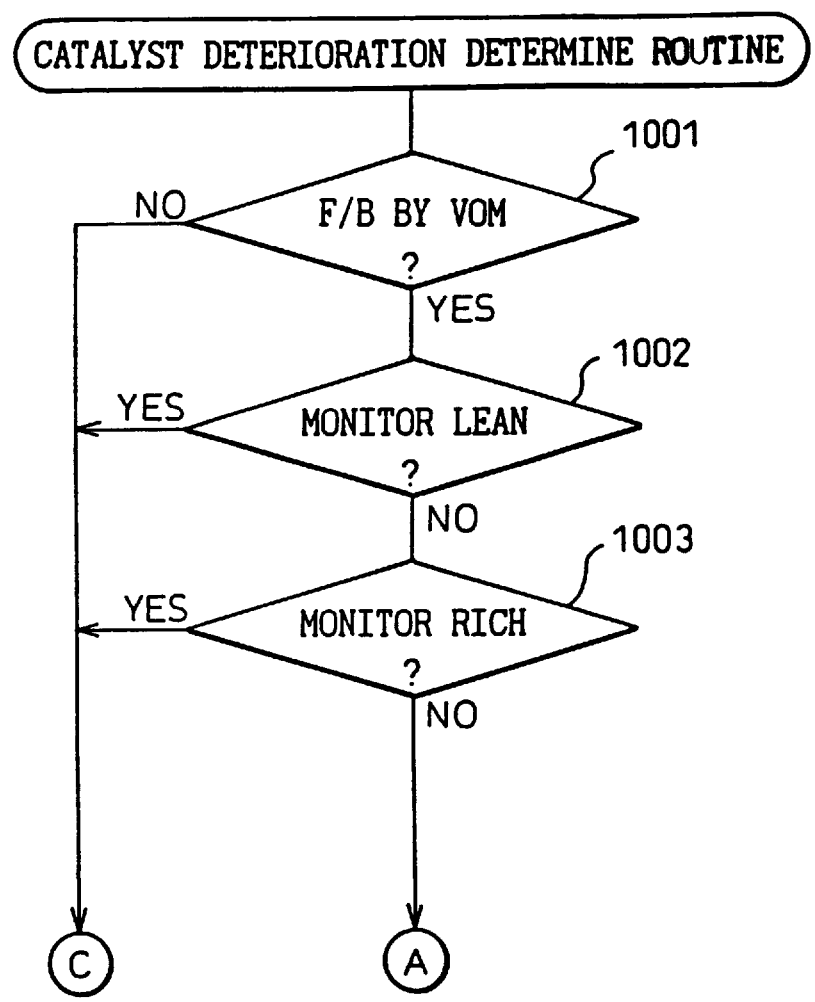
FIGS. 8 to 10 are flowcharts showing a routine for calculating a deterioration index of a catalytic converter.
Figure 9:
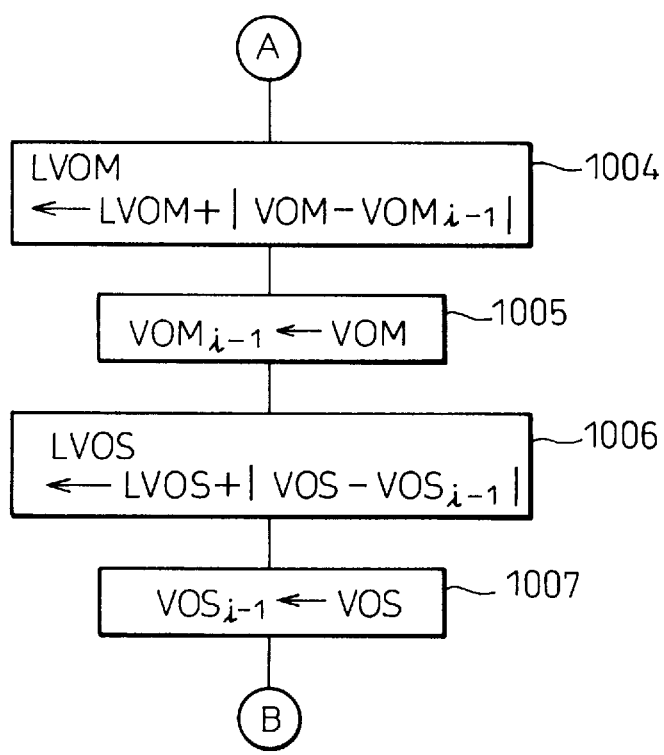
Figure 10:
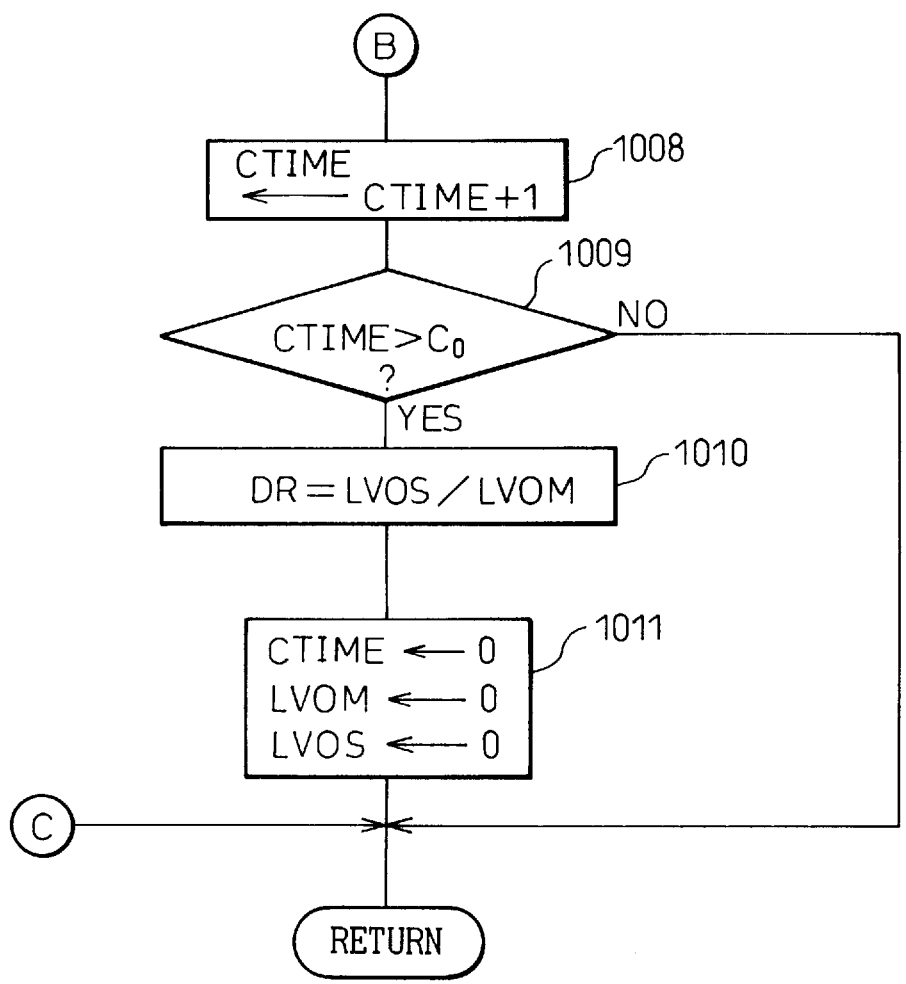

FIGS. 8 to 10 show routines for calculating the deterioration index DR of the catalytic converter 12. These routines are carried out at predetermined intervals only when a locus length LVOM (to be explained later) is effectively obtained, i.e., only when a feedback control according to the air-fuel-ratio sensor 15 is carried so that the output of the sensor 15 shows the waveform of FIG. 7A.

Step 1001 determines whether or not the air-fuel-ratio feedback control according to the output VOM of the sensor 15 is carried out. Step 1002 determines whether or not the output VOM of the sensor 15 has been lean for a predetermined period. Step 1003 determines whether or not the output VOM of the sensor 15 has been rich for the predetermined period.

Only when the air-fuel-ratio feedback control based on the output VOM of the sensor 15 is carried out and the output VOM has not been lean nor rich for the predetermined period, does step 1004 calculate the deterioration index DR of the front catalytic converter 12.

Even if the air-fuel-ratio feedback control based on the output VOM of the sensor 15 is carried out, the locus length LVOM is not effectively obtained if the output VOM of the sensor 15 has been lean or rich for the predetermined period. This is the reason why steps 1002 and 1003 are carried out.

Step 1004 calculates the locus length LVOM of the output VOM (FIG. 7A) of the air-fuel-ratio sensor 15 as follows:

LVOM←LVOM+|VOM−$VOM_{i-1}$|

Step 1005 updates $VOM_{i-1}$←VOM for the next execution.

Step 1006 calculates the locus length LVOS of the output VOS FIG. 7B or FIG. 7C of the air-fuel-ratio sensor 16 as follows:

LVOS←LVOS+|VOS−$VOS_{i-1}$|

Step 1007 updates $VOS_{i-1}$←VOS for the next execution.

Step 1008 increments a counter CTIME by +1. Step 1009 determines whether or not the counter CTIME is above a predetermined value Co, which is, for example, about 20 seconds corresponding to five times of inversions in the output VOM of the sensor 15. The value Co may properly be set so that a locus length in a given period is stable and correct even if the amplitude of the output VOS instantaneously fluctuates when the front catalytic converter 12 is not deteriorated. Only when CTIME>Co, is step 1010 carried out.

Step 1010 calculates the deterioration index DR of the catalytic converter 12 based on the ratio of LVOS to LVOM. Step 1011 clears CTIME, LVOM, and LVOS for the next calculation of the deterioration index DR of the converter 12. Then, the routines end.

As explained above, the present invention corrects the power supplied to a heater of an air-fuel-ratio sensor for radiant heat from a catalytic converter, thereby preventing the sensor from overheating.

What is claimed is:

1. An apparatus for controlling the supply of power to a heater of an air-fuel-ratio sensor, the sensor being installed close to a catalytic converter in an exhaust duct of an internal combustion engine, to detect the air-fuel ratio of exhaust gas emitted from the engine, the apparatus comprising:

means for detecting engine operating conditions;

means for calculating basic power according to the engine operating conditions;

means for calculating corrective power corresponding to radiant heat from the catalytic converter;

means for calculating target power from the basic power and corrective power; and means for controlling the supply of power so that the heater receives the target power.

2. The apparatus of claim 1, wherein the corrective power is calculated according to the detected engine operating conditions.

3. The apparatus of claim 2, further comprising means for determining a deterioration index of the catalytic converter, so that the corrective power is calculated from the deterioration index.

* * * * *